D. G. Watt.
Comb Frame.
Nº 91,885. Patented Jun. 29, 1869.
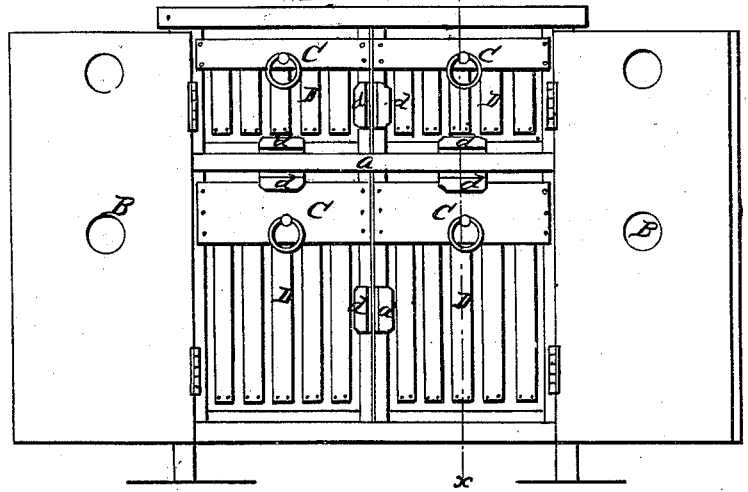
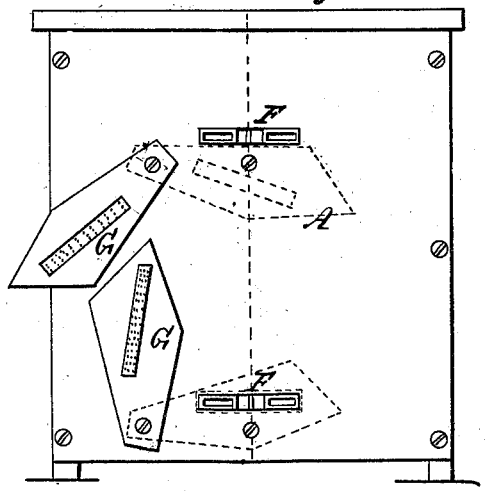
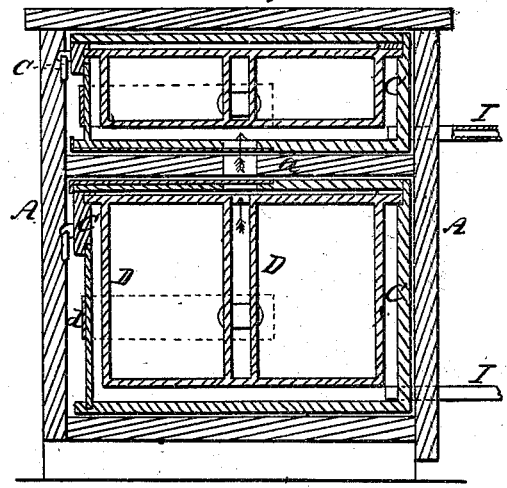
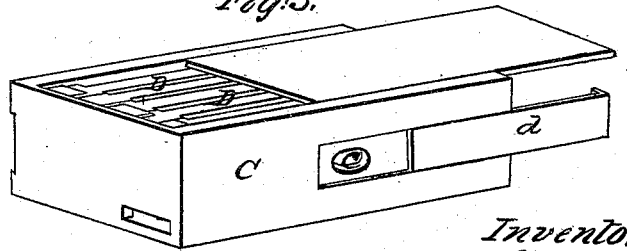
Witnesses
Inventor

United States Patent Office.

DAVID G. WATT, OF LAWRENCE, KANSAS.

Letters Patent No. 91,885, dated June 29, 1869.

---

IMPROVEMENT IN BEE-HIVES.

---

The Schedule referred to in these Letters Patent and making part of the same.

---

*To all whom it may concern:*

Be it known that I, DAVID G. WATT, of Lawrence, in the county of Douglas, and State of Kansas, have invented a new and useful Improvement in Bee-Hives, and I do hereby declare that the following is a full, clear, and exact description thereof, reference being had to the accompanying drawings, and to the letters of reference marked thereon.

The nature of my invention consists in the construction of a bee-hive provided with doors, boxes, honey or comb-frames, openings, or escapes, and tubes, with stops or cut-offs, which are more definitely designated by figures and letters in the accompanying drawings, and described as follows:

In Figure 1, letter A represents the casing or body of the hive; B B, the doors standing open; C C, the boxes with part of the ends removed, to show the vertical position of the frames D D in the boxes. The boxes are constructed in the ordinary manner, with sliding covers, and the frames of such size as to be easily removed, and, when all in place, fill loosely the entire box.

Figure 2 is a rear view of the hive.

The letters F represent openings for letting out the bees from any box when desired.

G G represent stops or cut-offs, attached to the body of the hive with a screw, made with an opening in the centre, covered with wire or perforated metal, to admit air. These are so attached to the hive that they will cover the openings F when desired.

I represents a tin tube of the shape of the openings F, which is inserted in the openings F when the bees are to be removed from any desired box, from which or through which they can leave the hive, but by which they cannot return, nor can millers enter.

Figure 3 is a front view of the hive when in condition for use, with the doors removed and the boxes all in place.

What I claim, and desire to secure by Letters Patent, is—

The hive A, honey-boxes C C, comb-frames D D, openings F, caps or stops G G, and tube I, all constructed and combined in the manner and for the purpose set forth.

DAVID G. WATT.

Witnesses:
GEO. J. BARKER,
OWEN A. BASSETT.